United States Patent [19]

Roinestad et al.

[11] Patent Number: 5,197,591
[45] Date of Patent: Mar. 30, 1993

[54] REPLACEABLE SNAP-ON MODULAR OVERLAY FOR ROD AND LINK TURN-CURVE CONVEYOR BELTS

[75] Inventors: Gerald C. Roinestad, Williamsburg, Va.; Michael R. Straight, Jefferson, La.; John G. Kucharski, Winchester, Va.

[73] Assignee: Ashworth Bros., Inc., Fall River, Mass.

[21] Appl. No.: 833,658

[22] Filed: Feb. 11, 1992

Related U.S. Application Data

[63] Continuation-in-part of Ser. No. 658,638, Feb. 22, 1992, abandoned.

[51] Int. Cl.$^5$ .............................................. B65G 29/00
[52] U.S. Cl. ............................. 198/803.01; 198/831; 198/852
[58] Field of Search ............... 198/852, 803.01, 831, 198/851, 853, 778

[56] References Cited

U.S. PATENT DOCUMENTS

| | | | |
|---|---|---|---|
| Re. 27,690 | 7/1893 | Roinestad et al. | 198/852 |
| 1,274,385 | 8/1918 | Colburn | 65/197 |
| 1,376,449 | 5/1921 | McKenzie | 198/845 X |
| 2,703,644 | 3/1955 | Van Lake | 198/848 |
| 2,792,928 | 5/1957 | Holz | 198/853 |
| 2,872,023 | 2/1959 | Bechtel | 198/853 |
| 3,225,898 | 12/1965 | Roinestad | 198/852 |
| 3,261,451 | 7/1966 | Roinestad | 198/852 |
| 3,333,678 | 8/1967 | Rodman | 198/852 |
| 3,416,645 | 12/1968 | Jones | 198/852 X |
| 3,602,364 | 8/1971 | Maglio et al. | 198/853 X |
| 3,799,328 | 3/1974 | Harvey | 198/853 |
| 3,870,141 | 3/1975 | Lapeyre et al. | 198/853 |
| 3,920,117 | 11/1975 | Roinestad | 198/848 |
| 3,977,514 | 8/1976 | Kaess | 198/853 |
| 4,051,949 | 10/1977 | Lapeyre | 198/853 |
| 4,159,763 | 7/1979 | Kewley et al. | 198/853 |
| 4,394,901 | 7/1983 | Roinestad | 198/850 |
| 4,469,221 | 9/1984 | Albert | 198/851 |
| 4,582,193 | 4/1986 | Larsson | 198/803.01 |
| 4,742,907 | 5/1988 | Palmaer | 198/831 |
| 4,867,301 | 9/1989 | Roinestad et al. | 198/852 |
| 4,878,362 | 11/1989 | Tyree, Jr. | 198/852 X |
| 4,893,710 | 1/1990 | Bailey et al. | 198/853 |
| 5,004,097 | 4/1991 | Roinestad et al. | 198/803.01 |

FOREIGN PATENT DOCUMENTS

| | | | |
|---|---|---|---|
| 0095933 | 8/1985 | European Pat. Off. | |
| 0201317 | 11/1986 | European Pat. Off. | |
| 0254604 | 1/1988 | European Pat. Off. | |
| 1577940 | 10/1980 | United Kingdom | |
| 2175560A | 12/1986 | United Kingdom | 198/803.01 |

OTHER PUBLICATIONS

Rexnord R85 Catalog (1984), pp. B-37, B-40, B-41, and B-43-B-45.

"An Introduction to Small Radius Omiflex ® and Small Radius Omni-Grid ®", by Ashworth Bros., Inc., Bulletin No. SR80 (Rev. Aug. 1983).

Primary Examiner—Robert P. Olszewski
Assistant Examiner—Cheryl L. Gastineau
Attorney, Agent, or Firm—Banner, Birch, McKie & Beckett

[57] ABSTRACT

An overlay for use in a conveyor system having at least one ware transport section and made up of a succession of overlays for transporting articles, wherein each overlay is supported and moved along by a belt of spaced rod members extending transversely of the direction of travel of the belt. Each overlay includes a plurality of laterally spaced substantially longitudinally disposed longitudinal members and a plurality of transversely disposed connecting means each connecting adjacent ones of the longitudinal members. Adjacent ones of the connecting means connect opposite end portions of the longitudinal members forming a plurality of alternating oppositely opening nestable segments, giving the overlay a zig-zag shape, which allow nesting thereof overlays immediately ahead and behind it on the belt. Each of the longitudinal members have a first and second support means which are opposed and longitudinally spaced from each other. Each support means include a rod member engaging means operable to receive a rod member when the overlay is moved relatively toward the respective rod member in a direction normal to the plane of the belt. The first and/or second support means each have a downwardly directed opening extending longitudinally of the longitudinal member and parallel to the plane of the belt allowing the belt to expand or collapse while the belt travels through an arcuate path about an axis parallel to the plane of the belt. The overlay is releasably clipped onto the rod members with a plurality of rod member retaining means.

96 Claims, 10 Drawing Sheets

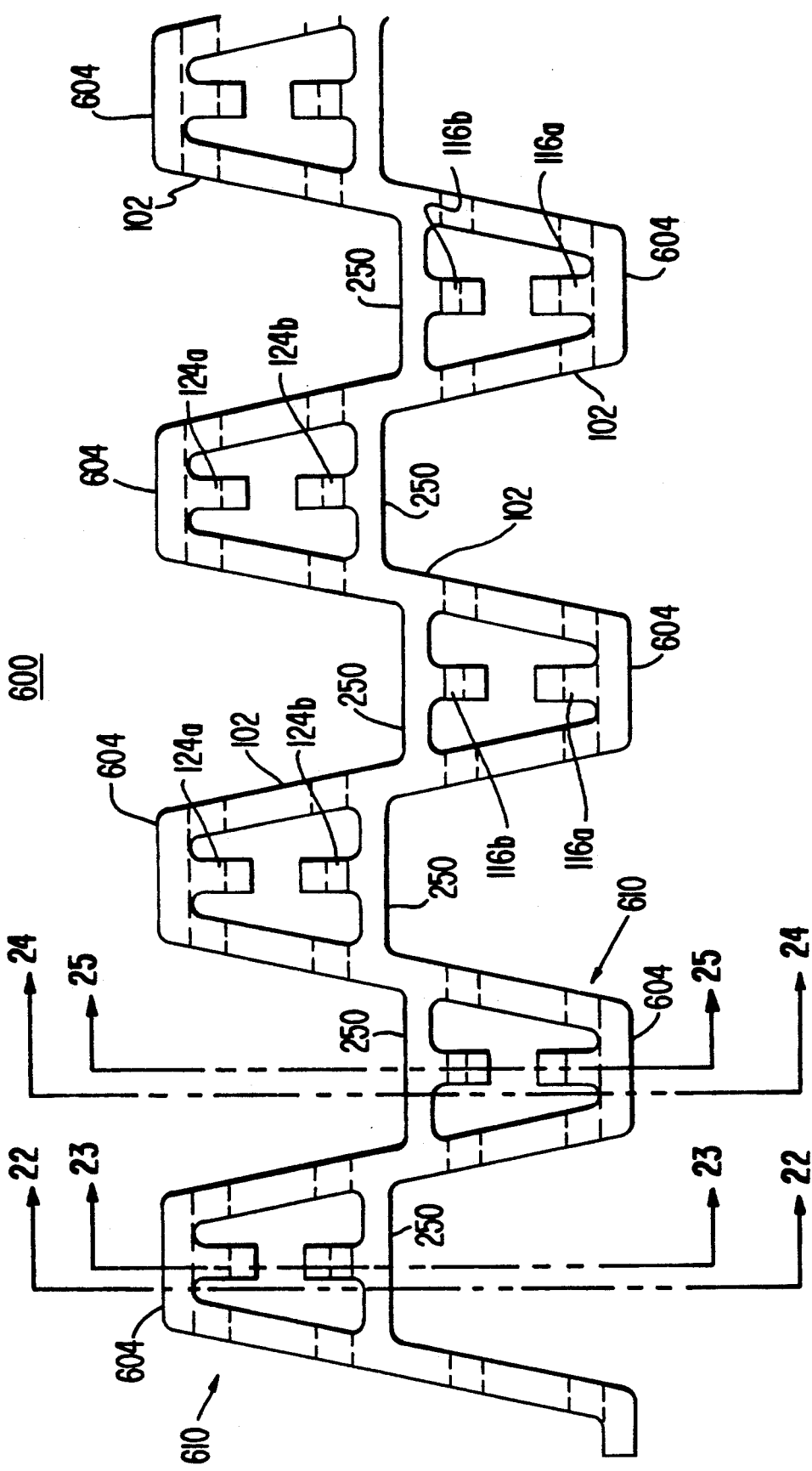

700

REPLACEABLE SNAP-ON MODULAR OVERLAY FOR ROD AND LINK TURN-CURVE CONVEYOR BELTS

This is a continuation-in-part (CIP) application of Ser. No. 07/658,638 filed Feb. 22, 1992 now abandoned.

FIELD OF THE INVENTION

This invention relates to conveyor belts and, more particularly, to ware-supporting attachments releasably attached to and extending between spaced rod members which extend transversely of the direction of travel of a collapsible-link conveyor belt and a method of assembly and retention of the individual attachments to the conveyor belt. The ware-supporting attachments impart only minimal tensile loads to the supported ware and moreover do not allow ware of small size to become trapped in the attachment.

BACKGROUND OF THE INVENTION

Conveyor apparatus are widely used in a great variety of industrial fields as part of automated machinery for transporting products or work pieces from one location to another automatically and repetitively with minimal operator control or observation. It is thus important that the conveyor construction be durable and reliable, and if damaged, easily and quickly repairable with readily available parts. Such conveyors in the past have employed chains or collapsible rod and link conveyor belts to which individual ware-supporting attachments are attached. The collapsible rod and link conveyor belt has a conveying surface of openframe construction formed by spaced rods in generally parallel relationship and extending transversely to the direction of motion of the belt. Typically, the rods are interconnected by two parallel rows of links at the extreme edges of the belt and thus at the opposite ends of the rods.

The present invention is particularly adapted for use in such collapsible rod and link conveyor belts An example of such a conveyor belt is shown in U.S. Pat. No. 3,225,898 to Gerald C. Roinestad, entitled "Collapsible Conveyor Belt." The conveyor belt of the Roinestad U.S. Pat. No. 3,225,898 includes a supporting surface comprising a plurality of transverse rods and a link construction which enables the conveyor belt to travel through an edgewise arcuate path in the plane of the belt as well as an arcuate path about an axis parallel to the plane of the belt. Chain conveyors typically do not lend themselves to situations requiring the conveyor belt to travel through an edgewise arcuate path in the plane of the belt, for example, a long helical path which requires the inner portion of the belt to collapse upon itself and/or the outer portion of the belt to expand as the belt travels such a path.

Numerous attachments have been used on conveyor apparatus to provide a supporting surface for the wares carried thereon. Non-collapsing attachments are disclosed for conveyors utilizing rods in U.S. Pat. Nos. 1,376,449 (grated support surface); 3,799,328 (grated support surface); 3,977,514 (continuous support surface); and 4,469,221 (grated support surface); and for conveyors utilizing chains in U.S. Pat. No. 4,582,193 (continuous support surface). Collapsing attachments are disclosed for collapsible rod and link-type conveyors in U.S. Pat. Nos. 27,690 (grated support surface); 2,872,023 (grated support surface); 3,261,451 (grated support surface); 3,333,678 (continuous support surface); 3,416,645 (continuous support surface); and 4,394,901 (continuous support surface).

The prior art attachments which provide a collapsible continuous support surface disclose attachments which meet one another along lines generally perpendicular to the direction of relative motion between collapsing attachments when travelling the straight portion of the conveyor. Subsequent expansion and collapsing of the various portions of the respective attachments relative to one another when the conveyor belt travels through an edgewise arcuate path in the plane of the belt imparts tensile forces across a similar line in an article resting upon at least two of such attachments. If the article is pliable or lacks sufficient cohesive strength, for example, a hamburger pattie, undesirable distortion or disassociation of the article may occur resulting in a non-acceptable product for market. Such attachments are considered herein to be tensioning attachments.

The prior art attachments which provide a collapsible grated support noted above are all of a flattened helix of wire. In such conveyor systems, when the belt collapses, the loops of one helix nest between the loops of the next helix. Subsequent expansion of two collapsed attachments under a common article imparts a series of minute shear forces across the article. The likelihood of distortion in the article is less as compared with prior art attachments providing a collapsible continuous support surface. Such attachments are considered herein to be non-tensioning attachments.

Problems associated with the use of flat helical mesh woven onto collapsible rod and link conveyor belts (grid belts) frequently have centered upon the inherent existence of a cavity or hole within each helix, formed by the opposing flat faces of the helix and the connective members extending through the end portions of such flat helixes. In belt structures having such cavities within the helix, it is possible for a relatively small diameter elongated item, e.g., a green bean or a threaded fastener, to slip into such a cavity and become trapped, thus presenting an unsanitary condition or possibly damaging the belt. One technique for avoiding this problem has been the use of a more tightly wound helix to provide a finer mesh. This approach, however, consumes much greater amounts of wire for a belt of given dimensions and renders such a belt both more costly and heavier than desirable, requiring heavier components to support the belt and more power to operate it.

U.S. Pat. No. 3,920,117 issued to Roinestad discloses an attachment which is trap-free as compared to a flat helix, but the attachment is not collapsible. Other trap-free, non-collapsing attachments are disclosed in U.S. Pat. Nos. 3,799,328; 4,469,221; and 4,582,193. Though these are trap-free attachments, they are also tensioning attachments.

A further problem associated with the non-tensioning attachments of the prior art is repair and/or replacement of a damaged or broken flat helix wire. Such a repair or replacement is not easily or readily accomplished. Considerable time and effort is required, resulting in an extended down-time period of the conveyor belt. The foregoing problem stems from the requirement that the flat helix wire be installed onto the rods of the belt prior to assembly of the belt in a given system.

Thus, there exists a need to provide a non-tensioning, trap-free ware-support attachment which can be used in conjunction with commercially available collapsible rod and link conveyor belts, and which is easily attachable and removable from an assembled belt without requiring complete disassembly of the conveyor belt system, the use of special tooling, nor specially skilled labor, while at the same time remaining securely fastened to the rods of the belt while in operation.

SUMMARY OF THE INVENTION

In a broad aspect of the invention, there is provided an overlay which is a non-tensioning, trap-free ware-support attachment for a collapsible rod and link conveyor system having a belt of spaced rod members extending transversely of the direction of travel of the belt and having at least one ware transport section. The conveyor system is made up of a succession of such overlays for transporting articles. Each overlay includes an upper overlay surface having leading and trailing portions with leading and trailing edges, respectively, and upon which the articles are supported. The overlay is provided with first support means which are removably attached to a first rod member and second support means which are removably attached to a second rod member of the belt. To accommodate belt travel through an arcuate path at least one of the first and second support means, preferably both, have an opening for receiving the representative rod member which is elongated in the direction of travel of the belt to allow expansion and collapsing of various portions of the respective overlays relative to one another while travelling through such an arcuate path.

More particularly, there is provided a ware transport overlay for use on a conveyor belt having a plurality of spaced transverse rods, said overlay comprising:

an elongated zig-zag member forming alternating oppositely opening nestable portions to allow nesting thereof with similar overlays immediately ahead and behind said overlay on said belt, said zig-zag member having a lower surface; and a plurality of downwardly opening snap-on retaining means on said lower surface for releasably snapping said overlay down onto at least one of the rods of said conveyor belt. The zig-zag member may further comprise means for allowing said belt to expand or collapse while the belt travels through an arcuate path in the plane of the belt.

Yet, more particularly, there is provided an overlay for use in a conveyor system having at least one ware transport section and made up of a succession of overlays for transporting articles, each overlay being supported and moved along by a belt of spaced rod members extending transversely of the direction of travel of said belt, said overlay comprising:

a plurality of laterally spaced substantially longitudinally disposed longitudinal members;

a plurality of transversely disposed connecting means each connecting adjacent ones of said longitudinal members, adjacent ones of said connecting means connecting opposite end portions of said longitudinal members so that the longitudinal members and connecting means form a plurality of alternating oppositely opening nestable segments to allow nesting thereof with overlays immediately ahead and behind said overlay on said belt;

each of said longitudinal members having a first support means and a second support means which are opposed and longitudinally spaced from each other, said first support means including a first rod member engaging means operable to receive a first rod member when said overlay is moved relatively toward said first rod member in a direction normal to the plane of said belt, said first rod member engaging means being provided with a first downwardly directed opening for receiving said first rod member, and said second support means including a second rod member engaging means operable to receive a second rod member when said overlay is moved relatively toward said second rod member in a direction normal to the plane of said belt, said second rod member engaging means being provided with a second downwardly directed opening for receiving said second rod member, said second downwardly directed opening extending longitudinally of said longitudinal member and parallel to the plane of said belt so as to allow said belt to expand or collapse while said belt travels through an arcuate path in the plane of said belt; and a plurality of first rod member retaining means, wherein each of said first rod member retaining means is releasably clippable onto said first rod member by movement normal to the plane of said belt.

In another aspect of the invention, there is provided in a conveyor system having at least one ware transport section and made up of a succession of overlays for transporting articles, each overlay providing an upper overlay surface upon which said articles are supported, each overlay being supported and moved along by a belt of spaced rod members extending transversely of the direction of travel of said belt, the improvement comprising in combination:

said overlay comprising an elongated zig-zag member forming alternating oppositely opening nestable portions to allow nesting thereof with similar overlays immediately ahead and behind said overlay on said belt, said zig-zag member having a lower surface; and a plurality of downwardly opening snap-on retaining means on said lower surface for releasably snapping said overlay down onto at least one of the rods of said conveyor belt.

The zig-zag member further comprises means for allowing said belt to expand or collapse while said belt travels through on arcuate path in the plane of said belt.

More particularly, there is provided in a conveyor system having at least one ware transport section and made up of a succession of overlays for transporting articles, each overlay providing an upper overlay surface with leading and trailing edges and upon which said articles are supported, each overlay being supported and moved along by a belt of spaced rod members extending transversely of the direction of travel of said belt, the improvement comprising in combination:

said overlay comprising:

a plurality of laterally spaced substantially longitudinally disposed longitudinal members;

a plurality of transversely disposed connecting means each connecting adjacent ones of said longitudinal members, adjacent ones of said connecting means connecting opposite end portions of said longitudinal members so that the longitudinal members and connecting means form a plurality of alternating oppositely opening nestable segments to allow nesting thereof with overlays immediately ahead and behind said overlay on said belt;

each of said longitudinal members having a first support means and a second support means which are opposed and longitudinally spaced from each other, said first support means including a first rod member engaging means operable to receive a first rod member when said overlay is moved relatively toward said first rod member in a direction normal to the plane of said belt, said first rod member engaging means being provided with a first downwardly directed opening for receiving said first rod member, and said second support means including a second rod member engaging means operable to receive a second rod member when said overlay is moved relatively toward said second rod member in a direction normal to the plane of said belt, said second rod member engaging means being provided with a second downwardly directed opening for receiving said second rod member, said second downwardly directed opening extending longitudinally of said longitudinal member and parallel to the plane of said belt so as to allow said belt to expand or collapse while said belt travels through an arcuate path in the plane of said belt; and a plurality of first rod member retaining means, wherein each of said first rod member retaining means is releasably clippable onto said first rod member by movement normal to the plane of said belt.

The overlays may further comprise a reinforcing means located within each of the segments formed by the connecting means connecting associated pairs of longitudinal members for inhibiting compression or expansion of the overlay in a direction parallel to the first and second rod members to which the overlay is attached. The reinforcing means may be a reinforcing member located within each of the segments formed by the connecting means connecting associated longitudinal members between each corresponding pair of connected longitudinal members for inhibiting compression or expansion of the overlay in a direction parallel to the first and second rod members. Alternatively, the reinforcing member may be connected to and integral to the connecting means and to opposing sides of the associated pair of connected longitudinal members adjacent to the connecting means. In this embodiment, reinforcing member is a solid mass which has a bottom surface defining a portion of the corresponding downwardly directed opening of the first or second support means.

The connecting means would be an apex member or a connecting member. The apex member comprises a direct connection of the opposing end portions of two longitudinal members wherein the segments thereby are angular in shape. Alternatively, connecting means may be a connecting member connected to and imposed between the opposing end portions of two longitudinal members, preferably in parallel orientation relative to the rod members.

The first downward directed openings may optionally extend longitudinally of the respective longitudinal member and parallel to the plane of the belt so as to allow the belt to expand or collapse while the belt travels through an arcuate path about an axis parallel to the plane of the belt.

The overlays may further comprise a plurality of second rod member retaining means, wherein each of the second rod member retaining means is releasably clippable onto the second rod member by movement normal to the plane of the belt.

Preferably, each of the first rod retaining means has a first jaw means. Furthermore, each of the second rod retaining means preferably has a second jaw means.

The plurality of first jaw means cooperates with the first rod member engaging means to releasably retain the first rod member. Likewise, the plurality of second jaw means cooperates with the second rod member engaging means to releasably retain the second rod member.

The first and second jaw means may comprise jaw parts having mutually inclined surfaces at the entry way of the mouth thereof which assist in positioning the first and second rod member retaining means relative to first and second rod members, respectively, prior to attachment thereto and which cause corresponding jaw parts to be urged apart resiliently to permit rod members to enter into their respective rod member engaging means upon application of downward pressure to the overlay.

In one embodiment of the overlay of the present invention, the overlay has a plurality of the first rod member engaging means with a first rod member retaining means having a first jaw means. The overlay also has a plurality of the second rod member engaging means with a second rod member retaining means having a second jaw means.

In another embodiment of the overlay of the present invention, the reinforcing means of the overlay is a reinforcing member located within each of the segments. The plurality of first rod member retaining means is associated with and corresponds to a first plurality of the segments. The plurality of second rod member retaining means is associated with and corresponds to a second plurality of the segments.

In each of the segments of the first and second plurality of segments, the corresponding first or second jaw means cooperates with an associated pair of first or second rod member engaging means to retain the respective rod member. Each of the first and second jaw means has jaw parts with two jaw members which define a mouth into the downwardly directed openings of the respective pair of rod member engaging means. The first jaw member is connected to the associated connecting means and the second jaw member is connected to the associated reinforcing member. The first and second jaw members of each jaw means are oriented parallel to the plane of the conveyor belt and extend in a direction normal to the axis of the respective rod members (i.e., parallel to the direction of movement of the belt, preferably extending toward each other to define the mouth. On an overlay, the mouths of the first jaw means are axially aligned with each other. Likewise, the mouths of the second jaw means are axially aligned with each other.

As a result, a plurality of these cooperating overlays provides a grated horizontal surface formed by the nesting of the segments of the overlays. Such a surface is non-tensioning and trap-free. The first and second support means of each overlay cooperate with the first and second rod member engaging means, respectively, to secure its corresponding rod member and the longitudinally elongated openings of at least one of the first and second support means, preferably both, of each overlay do not hinder travel of the belt through an arcuate path in the plane of the belt which includes an arcuate path that is helical, through an arcuate path about an axis parallel to the plane of the belt or through a vertical path.

Additionally, the reinforcing member may protrude past the last longitudinal member on either end of the overlay. The length of the protrusion may be varied to assist in positioning the overlays in a staggered position to promote nesting of the segments thereof. The protrusions may be utilized to effect end to end connections of a plurality of overlays in a transverse direction to the belt along a particular pair of rod members. The end connections may be male and female correspondingly.

The longitudinal member, connecting means and optional reinforcing member can be easily severed so as to yield several shorter overlays from a single long overlay module. The bottom surface of the longitudinal, connective and reinforcing members are preferably coplanar to prevent rocking or binding of overlays when traveling the path of the belt having at least one rail.

Accordingly, these and other objects, features, and advantages of the present invention will become apparent to those skilled in the art, from a consideration of the following detailed description of preferred embodiments, wherein reference is made to the figures in the accompanying drawings.

IN THE DRAWINGS

FIG. 21 is a top view of another embodiment of an overlay of the present invention prior to installation.

DETAILED DESCRIPTION OF THE PREFERRED EMBODIMENTS

Figure 1:
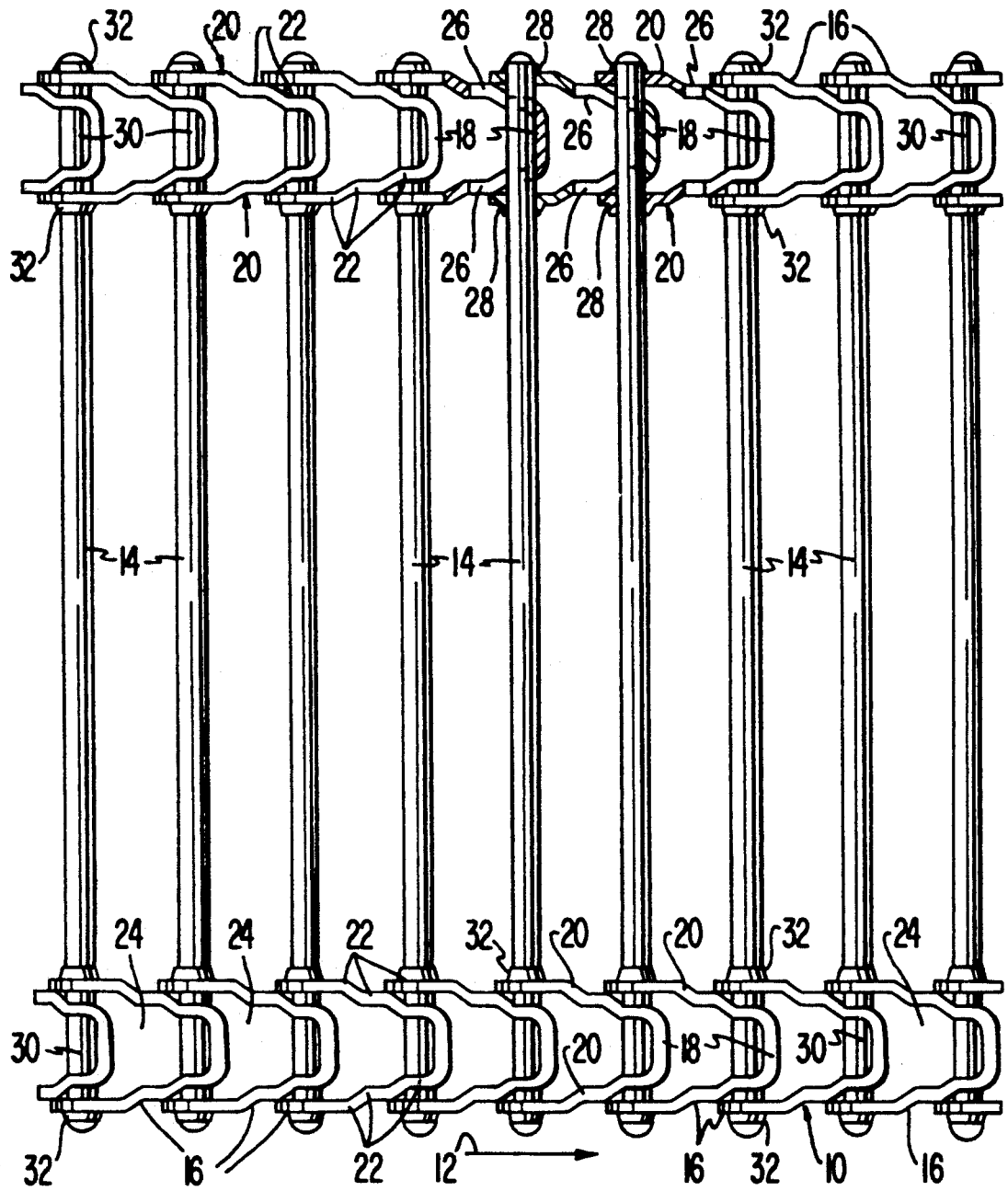
FIG. 1 is a top view of a conveyor belt of the spaced, transverse rod construction of a conveyor system.

In referring herein below to the various figures of the drawings, like reference numerals will be utilized to refer to identical parts and features of the devices shown therein.

Figure 2:
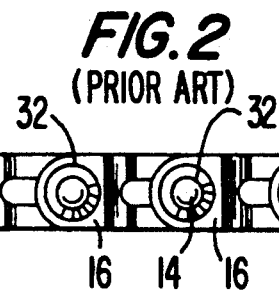
FIG. 2 is a side elevation of the conveyor belt shown in FIG. 1.

Referring now to the drawings, and more particularly to FIGS. 1 and 2, there is shown by way of illustration, but not of limitation, a conveyor belt 10 of the spaced, transverse rod construction. The conveyor belt 10 depicted is according to U.S. Pat. No. 3,225,898 to Roinestad, which is hereby incorporated by reference. As disclosed in pertinent part therein, the conveyor belt 10 includes a plurality of transverse rods 14 shown in FIG. 1 in their normally parallel, equally longitudinally spaced relationship extending transversely to the straight longitudinal direction of motion of the conveyor belt 10, as indicated by the arrow 12 in FIG. 1. For convenience of description, the orientation of the conveyor belt 10 as shown in FIG. 1 will be defined as lying in a horizontal plane and moving in a straight line path therein, although it will be appreciated that the plane of the belt 10 may be inclined at an angle relative to a normally horizontal plane. The rods 14 are slidably and pivotally interconnected at each of their ends by a plurality of generally U-shaped, stepped connecting links 16.

Each of the links 16 includes a straight base portion 18 having a pair of legs 20 rigidly connected to its outer ends. Each of the legs 20 has a plurality of stepped portions 22 to provide a spacing 24 within each of the links 16 which is relatively narrow at the base portion 18 and which becomes progressively wider at the opposite end thereof. The stepped portions 22 of each link are constructed substantially parallel to each other and to the direction of movement of the belt. Each of the links 16 includes, in the legs 20 thereof, a pair of aligned, elongated rod openings 26 adjacent the base 18 and a pair of generally circular, aligned rod openings 28 near their outer ends.

The connecting links 16 are arranged in partially nested or telescoped relationship with the inner, reduced width end 18 of each link 16 received between the wider end of the legs 20 of the respectively next succeeding link 16. Thus, the outer, more widely spaced ends of the legs 20 of each connecting link 16 overlap the base or inner end 18 of the adjoining link so that the rod openings 28 are aligned with the rod openings 26 of the preceding link. A rod 14 is received, at each of its opposite ends, through the aligned openings 26 and 28 of two adjoining links 16 and secured against withdrawal, such as by welding a shoulder 32 at the ends 30 of the rod 14 at each of the circular aligned rod openings 28. The shoulders 32 of each rod 14 secure the underlying leg 20 of its associated link 16 at each end 30 of the rod 14 to maintain the links 16 in fixed, spaced relationship. The rods 14 remain free to slide and to rotate within the slot 26 of the next preceding link 16. The links 16 therefore serve to pivotally and slidably interconnect the rods 14. The openings 24 within each link 16 provide a space between each rod 14 and the base 18 of an adjoining link 16 for receiving sprockets to permit the belt 10 to be driven.

Figure 19:
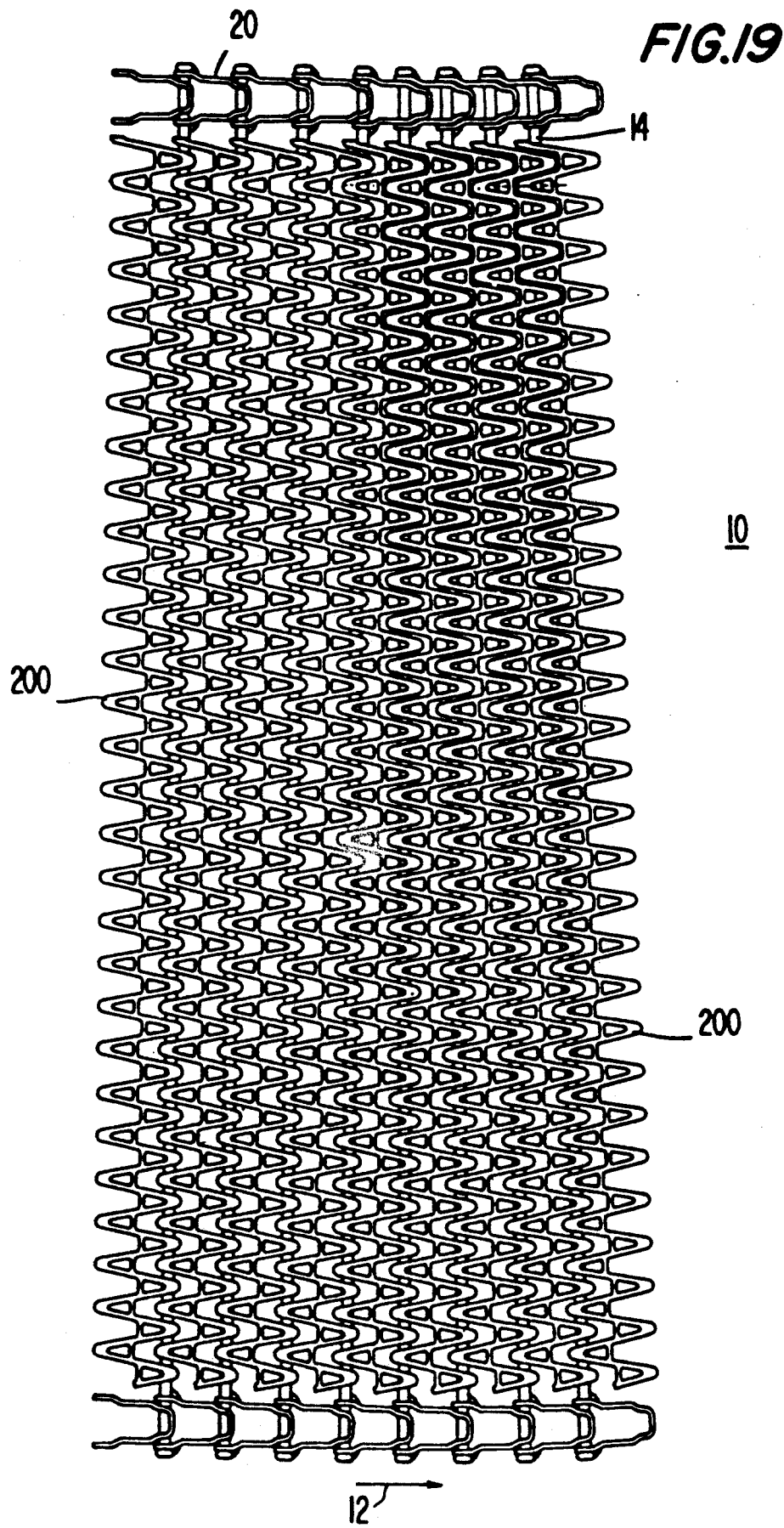
FIG. 19 is a top view of a portion of the conveyor belts shown in FIG. 1 with overlays of FIG. 13 negotiating an arcuate path in the plane of the conveyor belt.
Figure 22:
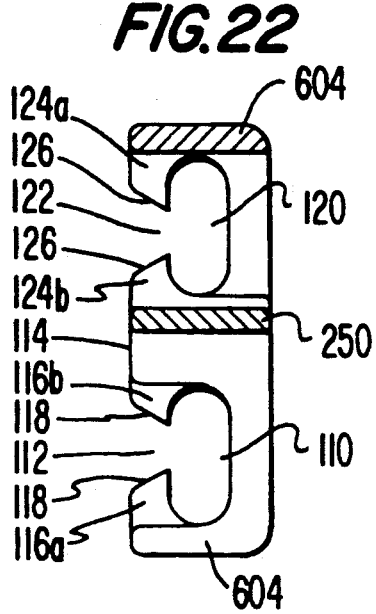
FIG. 22 is a side sectional view of the overlay of FIG. 21 taken along line 22—22 thereof.

The interconnecting link construction of the belt 10 permits the belt to be driven through an arcuate path in the plane of the belt, for example, as shown in FIG. 19. The arcuate path may also be defined as arcuate about an axis parallel to the plane of the belt 10. The elongated slots 26 permit the links 16 to nest more closely, thereby enabling one edge of the belt 10 to collapse. The rods 14 move from their normally parallel, evenly spaced relationship to an angular or diverging relationship when one edge of the belt 10 is collapsed, as shown in FIG. 19.

It is here again noted that the present invention is not limited to the foregoing type of collapsible rod and link conveyor system. For that member, the overlay of the present invention may be utilized on any conveyor system which utilizes parallel rod construction. The parallel rods may be fixed such that they are not collapsible or they may be interconnected at at least one of their ends to allow only one end to expand or collapse. Alternately, the overlays of the present invention may be utilized on a Small Radius Omni-Grid ® belt available from Ashworth Bros., Inc., Winchester, Va. In such a belt, there are three rows of links on each of the rod members. The inside and outside links are stepped links such as those described above; however, the outside links are larger because they negotiate a larger radius turn than the inside links through an edgewise arcuate path. This middle link on each rod is a straight sided link with circular holes therethrough to accommodate the rod members and acts as a pivot point for the rod members as the edgewise arcuate paths are negotiated by the belt.

Figure 3:
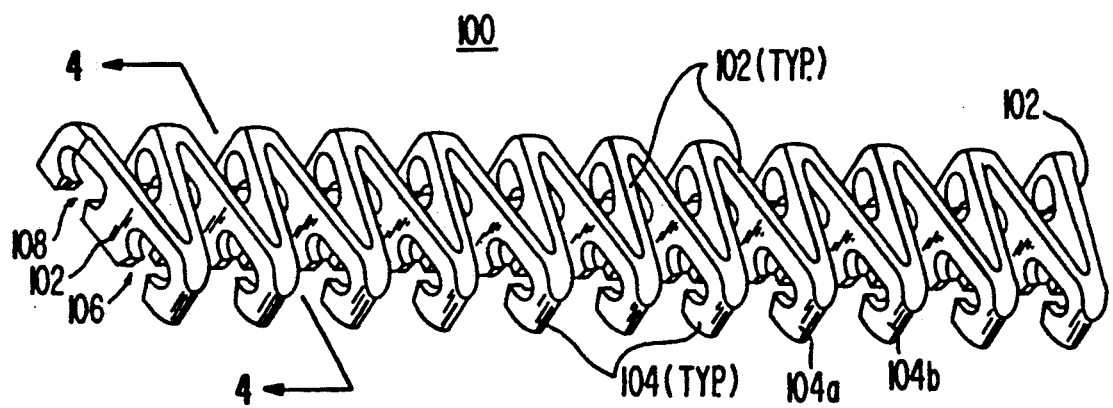
FIG. 3 is a perspective view of embodiment of an overlay of the present invention prior to installation.
Figure 4:
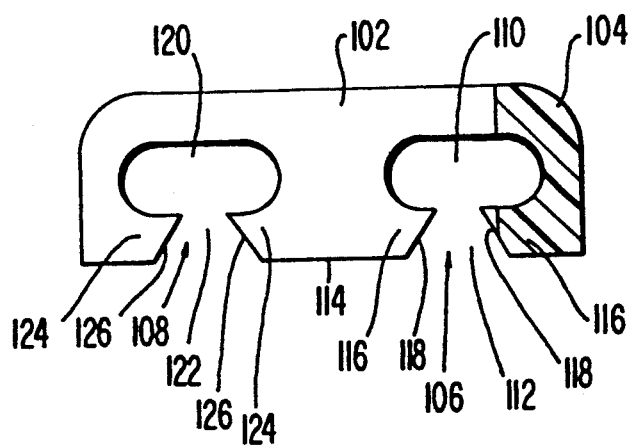
FIG. 4 is a side sectional view of the overlay of FIG. 3 taken along line 4—4 thereof.

Referring now to FIGS. 3 and 4, there is shown an overlay 100 which is a non-tensioning, trap-free ware-support attachment for a collapsible rod and link conveyor system (not shown) having a belt 10 of spaced rods 14 extending transversely of the direction of travel of the belt 10. The conveyor system is made up of a succession of such overlays 100 for transporting articles. The overlay 100 has a plurality of laterally spaced substantially longitudinally disposed longitudinal members 102 and a plurality of transversely disposed apex members 104. The apex members 104 each are formed by directly connecting the opposing end portions of two longitudinal members 102. Adjacent ones of the apex members 104, for example, apex members 104a and 104b, connect opposite end portions of the associated longitudinal members 102 so that the longitudinal member 102 and apex members 104 form a plurality of alternating oppositely opening nestable segments to allow nesting thereof with overlay 100 immediately ahead and behind this overlay 100 on the conveyor belt 10.

Each longitudinal member 102 has a first support means 106 and a second support means 108 which are opposed and longitudinally spaced from each other. The first support means 106 has a first aperture 110 and a first open access slot 112 extending from the first aperture 110 to the bottom surface 114 of the longitudinal member 102 to permit lateral access to the first aperture 110, thereby forming a first downwardly directed opening for receiving a rod 14. The first support means 106 has a first jaw means having first jaw parts 116 having mutually inclined surfaces 118 at the entry way of the mouth of the first jaw parts 116 and which define the first open access slot 112.

The second support means 108 has a second aperture 120 and a second open access slot 122 extending from the second aperture 120 to the bottom surface 114 of the longitudinal member 102 to permit lateral access to the second aperture 120, thereby forming a second downwardly directed opening for receiving a rod 14. The second support means 108 has a second jaw means having second jaw parts 124 having mutually inclined surface 126 at the entry way of the mouth of the second jaw parts 124 and which define the second open access slot 122.

In this embodiment of the overlay 100, the first aperture 110 and second aperture 120 are elongated slots extending longitudinally of the respective longitudinal member 102 and parallel to the plane of the conveyor belt 10 so as to allow the belt 10 to expand or collapse while the belt 10 travels through an arcuate path about an axis parallel to the plane of the belt 10.

Figure 5:
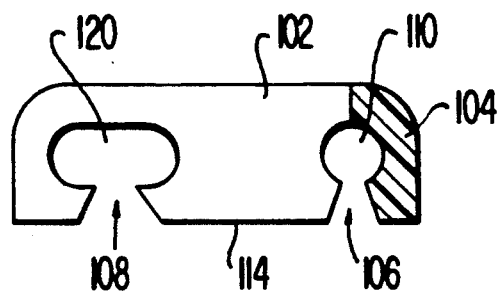
FIGS. 5, 6 and 7 are views similar to FIG. 4 but shown slight modifications.

Alternatively, as shown in FIG. 5, the first aperture 110 may be substantially circular, rather than an elongated slot, with a diameter slightly greater than the diameter of rod 14 so that cleanability may be maintained and rod 14 is allowed to rotate freely therein.

Figure 6:
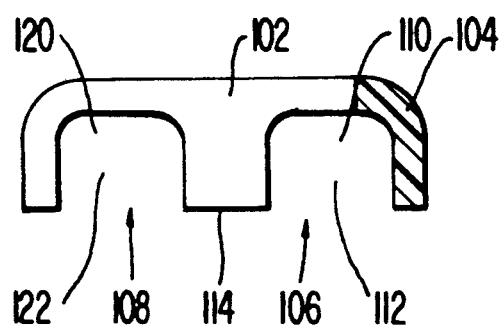
Figure 7:
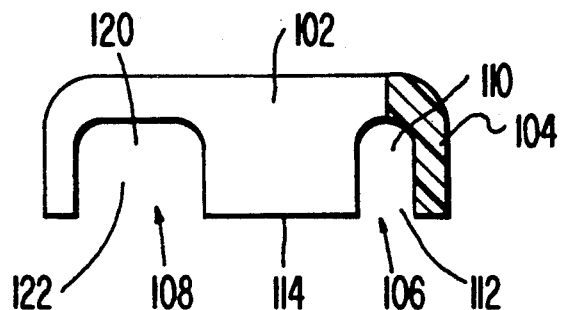

In another variation of overlay 100, a plurality of the longitudinal members 102, as shown in FIGS. 4 and 5 have a first jaw parts 116 associated with the first support means 106 and a second jaw parts 124 associated with the second support means 108. Referring now to FIGS. 6 and 7, the remaining longitudinal members 102 would not have jaw parts associated with the first support means 106 and second support means 108 thereof. As shown in FIGS. 6 and 7, each of the remaining longitudinal members 102 would have a first access slot 112 and a second access slot 122 having a longitudinal dimension substantially equal to that of the first aperture 110 and second aperture 120, respectively.

Another modification to overlay of the present invention for example referencing overlay 100 of FIG. 3, the longitudinal members 102 may be progressively larger from one end of the overlay to the other with the first and second apertures 110 and 120, respectively, being positioned and sized on the respective longitudinal members 102 so that the conveyor belt 10 undergoes only longitudinal expansion at the transition point between a straight-line section and an arcuate path section such as a lateral curve or helical path in a manner similar to U.S. Pat. No. 4,878,362. In particular, the longitudinal expansion is experienced only at the outer edge of the conveyor belt 10 as the conveyor belt 10 goes through this transition point. The longitudinal dimensions of the first and/or second aperture 110 and 120, respectively, increases elongation from the inner to the outer ends of the conveyor belt 10. As the conveyor belt 10 enters the arcuate path section, the rods 14 are angularly displaced spreading upward just short of the outer most longitudinal surfaces of apertures 110 and 120.

Figure 8:
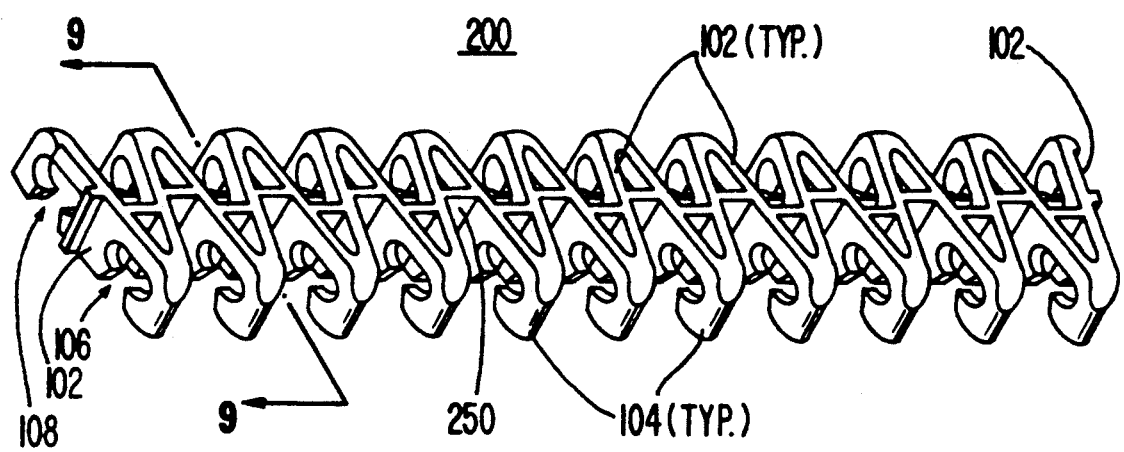
FIG. 8 is a perspective view of another embodiment of an overlay of the present invention prior to installation.
Figure 9:
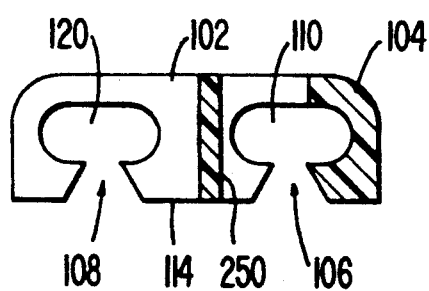
FIG. 9 is a side sectional view of the overlay of FIG. 8 taken along line 9—9 thereof.

Referring now to FIGS. 8 and 9, there is shown an overlay 200 which is like the overlay 100 shown in FIGS. 3 and 4 in all respects except that overlay 200 also includes a reinforcing member 250. The reinforcing member 250 is substantially parallel to the axis of the rods 14. The ends of each of the reinforcing members 250 are connected to opposing sides of a pair of longitudinal members 102. The reinforcing members 250 are located within the segments formed by a pair of said longitudinal members 102 connected to their corresponding apex member 104. The ends of each of the reinforcing members 250 are connected to the opposing side of its corresponding pair of said longitudinal members 102 at a point intermediate of the first support means 106 and the second support means 108 of the respective longitudinal members 102.

Figure 11:
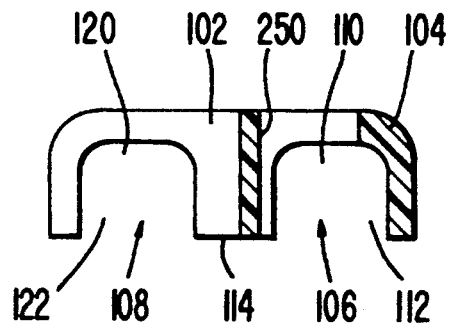
FIGS. 10, 11 and 12 are views similar to FIG. 9 but showing slight modifications.
Figure 10:
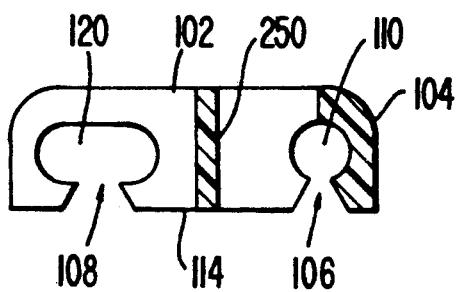
Figure 12:
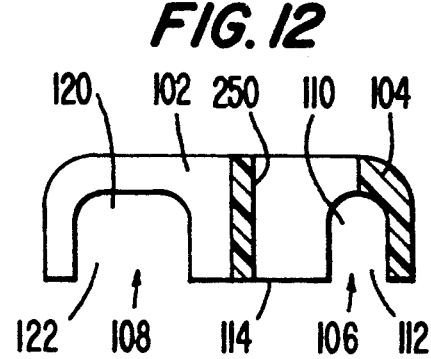
Figure 13:
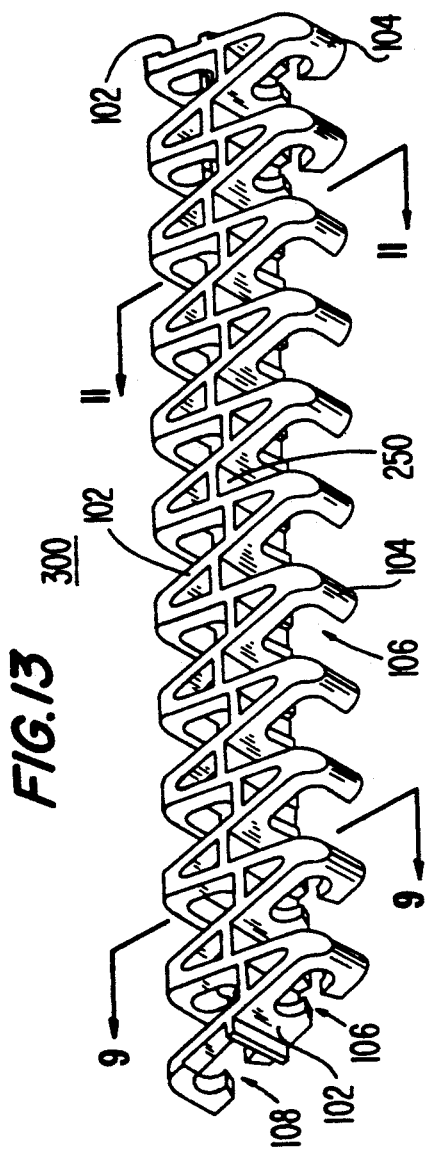
FIG. 13 is a perspective view another embodiment of an overlay of the present invention prior to installation.

The longitudinal members 102 shown in FIGS. 10, 11 and 12 are like those shown in FIGS. 5, 6 and 7, respectively, in all respects except that the attached reinforcing member 250 is shown. FIG. 13 shows overlay 300 which is like overlay 200 of FIG. 8, but has a combination of a plurality of longitudinal members 102 according to FIG. 9 and a plurality of longitudinal members 102 according to FIG. 11, which do not include jaw parts 116 and 124.

Figure 14:
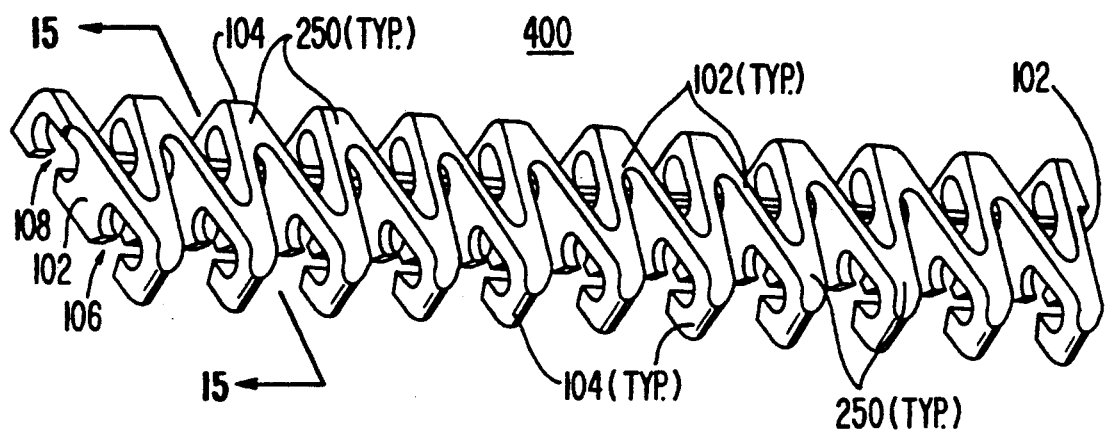
FIG. 14 is a perspective view of another embodiment of an overlay of the present invention prior to installation.
Figure 15:
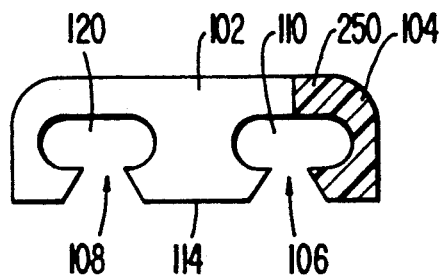
FIG. 15 is a side sectional view of the overlay of FIG. 14 taken along line 15—15 thereof.
Figure 17:
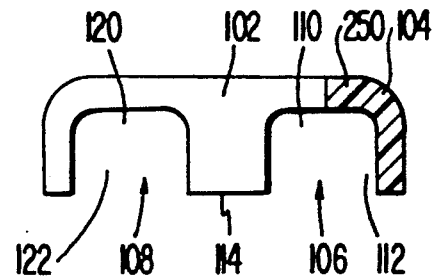
FIGS. 16, 17 and 18 are similar views to FIG. 15 but showing slight modifications.
Figure 16:
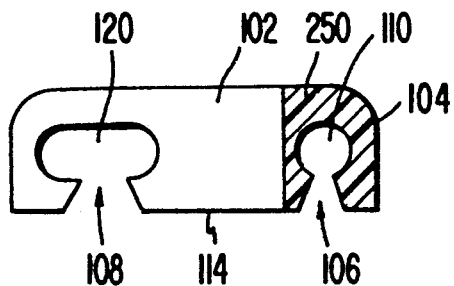
Figure 18:
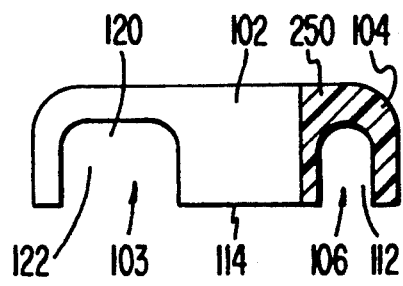

Referring now to FIGS. 14 and 15, there is shown an overlay 400 which is like the overlay 100 shown in FIGS. 3 and 4 in all respects except that overlay 400 also include a reinforcing member 250. The reinforcing member 250 herein is a solid mass. The reinforcing member 250 connects to and is integral to the apex member 104 and the opposing sides of the associated pair of connected longitudinal member 102 wherein the solid mass has a bottom surface which defines a portion of the corresponding aperture 110 or 120. In essence, the reinforcing member 250 constitutes an apex member 104 which has been enlarged by increasing the size thereof thereby filling more of the segment formed by the apex member 104 connecting its associated pair of longitudinal members 102 as is apparent when comparing the longitudinal members 102 shown in FIGS. 4 and 15. Longitudinal members 102 like these shown in FIGS. 5, 6 and 7 having such a reinforcing member 250 are shown in FIGS. 16, 17 and 18, respectively.

Referring now to FIG. 19, there is shown a section of a conveyor belt 10 having a succession of overlays 200, and showing the transition point between a straight-line path and an arcuate path in the plane of the belt 10. The inner edge of the belt 10 shows overlays 200 collapsing on each other.

Figure 20:
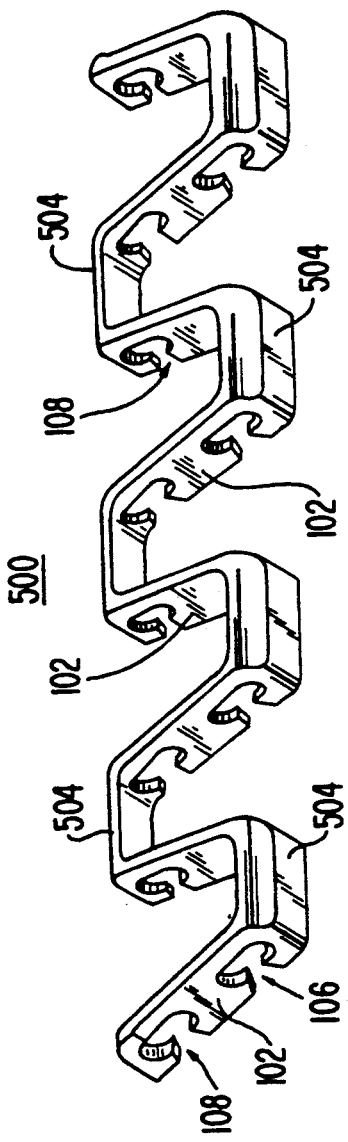
FIG. 20 is a perspective view of another embodiment of an overlay of the present invention prior to installation.

Referring now to FIG. 20, there is shown an overlay 500 which is like the overlay 100 shown in FIG. 3 in all respects except that overlay 500 has connecting members 504 instead of apex members 104 to connect the opposing end portions of respective pairs of longitudinal members 102. These connecting members 504 are substantially parallel to the main axis of rods 14. Though a conveyor belt 10 made up of a succession of such overlays 500 is non-tensioning, it may not be entirely trap-free.

Referring now to FIG. 21 and FIGS. 22-25, there is shown an overlay 600 which is similar to the overlay 300 shown in FIG. 13 except for the location of the jaw parts and overlay 600 has connecting members 604 instead of apex members 104 to connect the opposing end portions of respective pairs of longitudinal members 102. These connecting members 604 are substantially parallel to the main axis of rods 14. The longitudinal members 102 are generally like those depicted in FIG. 11.

Figure 25:
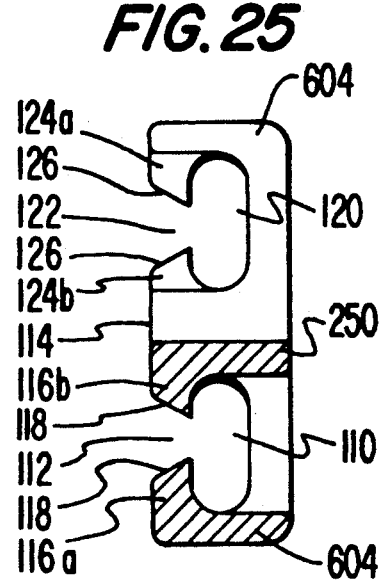
FIG. 25 is a side sectional view of the overlay of FIG. 21 taken along line 25—25 thereof.

As shown in segment 610 in FIGS. 21 and 25, the first jaw parts has a first jaw member 116a and a second jaw member 116b. The first jaw member 116a is attached to connecting member 604 and extends transversely therefrom toward reinforcing member 250. The second jaw member 116b is attached to reinforcing member 250 and extends transversely therefrom toward connecting member 604. The first and second jaw members 116a and b of the first jaw parts have mutually inclined surfaces 118 at the entry way of the mouth of the first jaw parts and which define the first open access slot 112.

Figure 23:
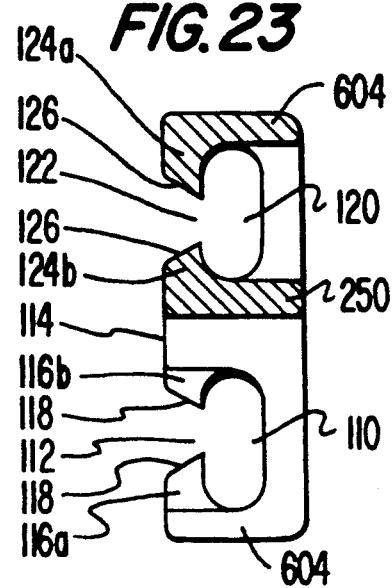
FIG. 23 is a side sectional view of the overlay of FIG. 21 taken along line 23—23 thereof.
Figure 24:
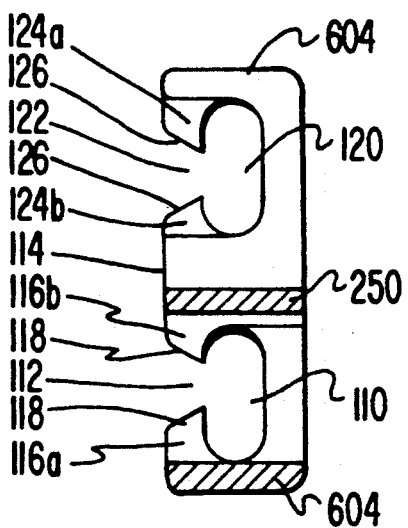
FIG. 24 is a side sectional view of the overlay of FIG. 21 taken along line 24—24.

Similarly, in the segment 610 shown in FIGS. 21 and 23, the second jaw parts has a third jaw member 124a and a fourth jaw member 124b. The third jaw member 124a is attached to connecting member 604 and extends transversely therefrom toward reinforcing member 250.

The fourth jaw member 124b is attached to reinforcing member 250 and extends transversely therefrom toward connecting member 604. The third and fourth jaw members 124a and b of the second jaw parts have mutually inclined surfaces 126 at the entry way of the mouth of the second jaw parts and which define the second open access slot 122.

In this embodiment of the overlay 600, the first aperture 110 and second aperture 120 are elongated slots extending longitudinally of the respective longitudinal member 102 and parallel to the plane of the conveyor belt 10 so as to allow the belt 10 to extend or collapse while the belt 10 travels through an arcuate path parallel to the plane of the belt 10.

Alternatively, as shown in FIG. 5, the first aperture 110 may be substantially circular, rather than an elongated slot, with a diameter slightly greater than the diameter of rod 14 so that cleanability may be maintained and the rod 14 is allowed to rotate freely therein.

Figure 26:
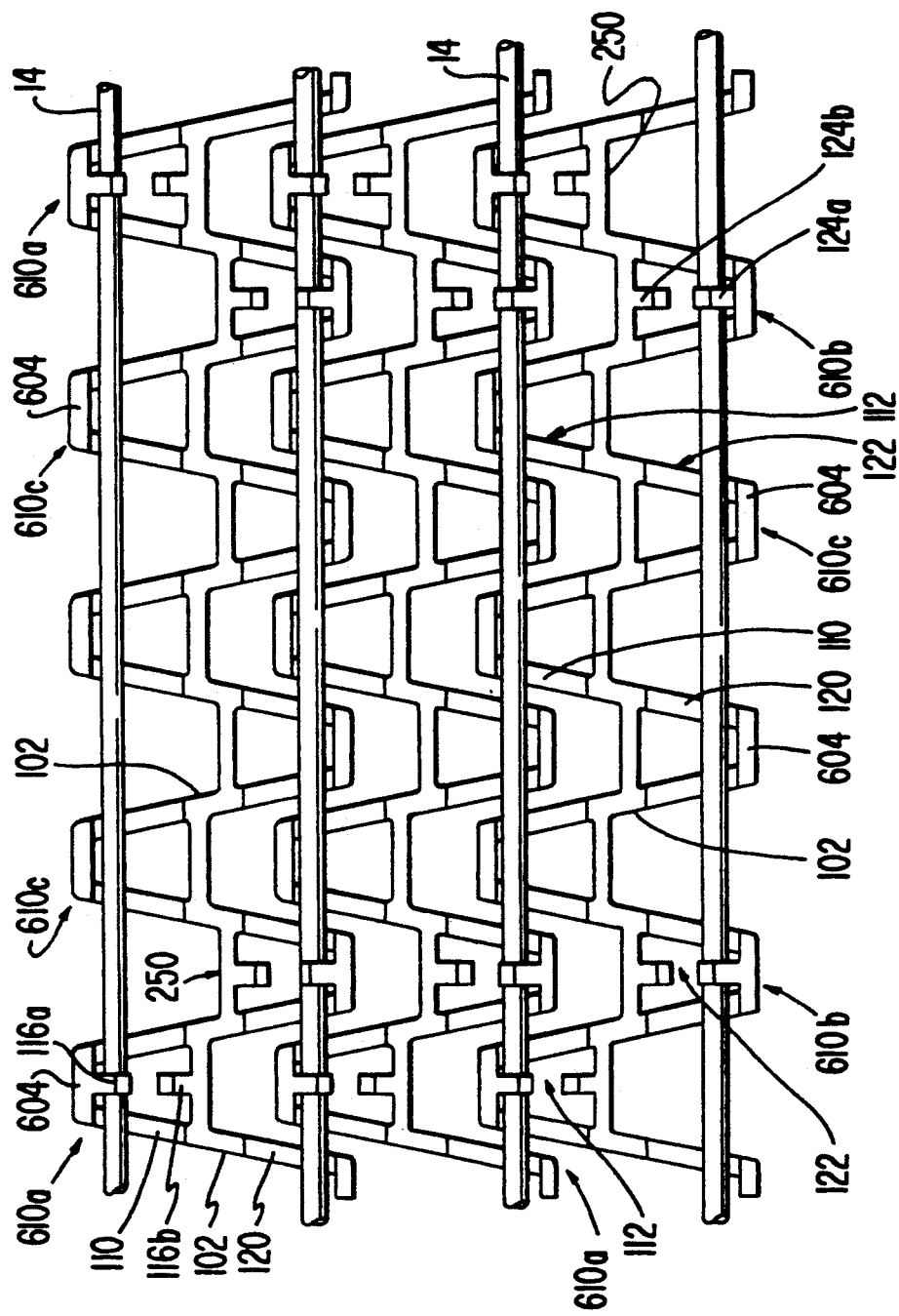
FIG. 26 is a bottom view of another embodiment of an overlay of the present invention.

In another variation of overlay 600 shown in FIG. 26, overlay 700 has a first plurality of segments 610a have a first jaw parts having a first and second jaw member 116a and b and a second plurality of segments 610b have a second jaw parts having a third and fourth jaw member 124a and b for releasably clipping onto rods 14. The remaining segments 610c would not have jaw parts associated with the first support means 106 and second support means 108 thereof nor with the connecting member 604 and reinforcing member 250 thereof. Similar to that shown in FIGS. 6 and 7, each of the longitudinal members 102 of the remaining segments 610c would have a first access slot 112 and a second access slot 122 having a longitudinal dimension substantially equal to that of the first aperture 110 and second aperture 120, respectively.

As readily apparent from the foregoing, the overlays of the present invention are adapted to be snapped on to two adjacent rods by applying pressure to a top surface of the overlays thereby pushing the jaw parts down onto the rods to snap them resiliently over the rods and held securely but detachably clipped to the rods. The open access slots or throats of the mouths of the respective jaw parts are narrower than the diameters of the rods, but the entries of the mouths are wider to enable the mouth to receive the rods readily for attaching the first and second support means to the rods. The interaction of the mutually inclined surfaces of the flared mouths where the cylindrical surfaces of the rods causes the jaw parts of the respective rod retaining means to be urged apart resiliently to permit the rods to enter into the rod engaging means of the respective first and second support means.

By virtue of the elongated slotted apertures 120 and optionally 110, the belt 10 is adapted to follow a path which is substantially horizontally or transversely curved in the plane of travel of the belt. The belt may travel not only in a circular path but in elliptical, sinuous, helical and many other belt paths. When the belt rounds a curve in the plane of the belt, the elongated slotted apertures allow the belt to expand or collapse in response to traveling through such a curve. In this manner, the belt adjusts itself freely to follow the curved path.

The overlays of the present invention can be molded from plastic into various shapes and sizes as is readily apparent from the Figures hereof. By employing a plastic material, it is possible to provide an overlay having resilient jaw parts to permit the overlay to be easily clipped onto a rod. However, the overlays of the present invention can be made of materials other than plastics, if desired, and can be made from steel, aluminum, or other metals. The principal factors influencing material selection include costs, ease of assembly and replacement, compatibility with the materials carried by the conveyor belt, and the environmental conditions to which the conveyor belt is subjected. Although metals can be used to form the overlays of the present invention, plastics are preferred because of the relatively light weight of such materials, the ease of manufacture (such as injection molding) resulting in lowering manufacturing costs, the ability to provide the overlays in virtually any shape desired, the resistance to corrosion, and the ability to incorporate suitable additives to provide the desired lubricity, anti-static properties, heat conduction properties, moisture absortivity, bioresistence, and the like. Examples of suitable plastics include, but are not limited to, polyolefins, polyamides, polyesters, polycarbonates, acrylics, polyurethanes, and phenolics.

It is understood that the disclosed apparatus is merely illustrative of the principles of the present invention. Other advantages of the overlays of the invention will be readily apparent to those skilled in the art. The overlays are simple and inexpensive to manufacture, and would be made of any desired strength and size. The overlays are quickly and easily installed without the use of special tools or equipment, and without the use of any additional hardware such as clips and the like. Further, one or more overlays may be quickly replaced, as where one becomes damaged, or where all the overlays from the conveyor belt are worn to the extent that it requires replacement.

It also will be understood that the overlay of this invention may be employed with various belt structures which may be designed to travel straight or curved paths or both. The invention is not restrictive to this specific belt structure shown in the drawings. Accordingly, the scope of the present invention is to be determined in accordance with the appended claims.

What is claimed is:

1. An overlay for use in a conveyor system having at least one ware transport section and made up of a succession of overlays for transporting articles, each overlay being supported and moved along by a belt of spaced rod members extending transversely of the direction of travel of said belt, said overlay comprising:
    a plurality of laterally spaced substantially longitudinally disposed longitudinal members;
    a plurality of transversely disposed connecting means each connecting adjacent ones of said longitudinal members, adjacent ones of said connecting means connecting opposite end portions of said longitudinal members so that the longitudinal members and connecting means form a plurality of alternating oppositely opening nestable segments to allow nesting thereof with overlays immediately ahead and behind said overlay on said belt;
    each of said longitudinal members having a first support means and a second support means which are opposed and longitudinally spaced from each other,
    said first support means including a first rod member engaging means operable to receive a first rod member when said overlay is moved relatively toward said first rod member in a direction normal to the plane of said belt,
    said first rod member engaging means being provided with a first downwardly directed opening for receiving said first rod member, and
    said second support means including a second rod member engaging means operable to receive a second rod member when said overlay is moved relatively toward said second rod member in a direction normal to the plane of said belt,
    said second rod member engaging means being provided with a second downwardly directed opening for receiving said second rod member,
    said second downwardly directed opening extending longitudinally of said longitudinal member and parallel to the plane of said belt so as to allow said belt to expand or collapse while said belt travels through an arcuate path in the plane of said belt; and
    a plurality of first rod member retaining means, wherein each of said first rod member retaining means is releasably clippable onto said first rod member by movement normal to the plane of said belt.

2. The overlay of claim 1, wherein each of said connecting means comprises a direct connection of the opposing end portions of two longitudinal members wherein the segments formed thereby are angular in shape.

3. The overlay of claim 2, further comprising a reinforcing means located within each of said segments between each corresponding pair of connected longitudinal members for inhibiting compression or expansion of said overlay in a direction parallel to said first and second rod members.

4. The overlay of claim 3, wherein each of said reinforcing means is a reinforcing member, the ends of said reinforcing member being connected to opposing sides of said pair of connected longitudinal members of the respective segment at a point thereon intermediate of said first and second support means thereof.

5. The overlay of claim 3, wherein each of said reinforcing means comprises a reinforcing member connecting and integral to said connecting means and to opposing sides of said pair of connected longitudinal members adjacent to said connecting means, said reinforcing member being a solid mass, said solid mass having a bottom surface defining a portion of the corresponding downwardly directed opening of said first support means or of said second support means.

6. The overlay of claim 1, wherein each of said connecting means comprises a connecting member connected to and interposed between the opposing end portions of two longitudinal members.

7. The overlay of claim 1, further comprising reinforcing means located within each of said segments between each corresponding pair of connected longitudinal members for inhibiting compression or expansion of said overlay in a direction parallel to said first and second rod members.

8. The overlay of claim 7, wherein each of said reinforcing means is a reinforcing member, the ends of said reinforcing member being connected to opposing sides of said pair of connected longitudinal members at a point thereon intermediate of said first and second support means.

9. The overlay of claim 1, wherein each of said first downwardly directed openings extends longitudinally of their respective longitudinal member and parallel to the plane of said belt so as to allow said belt to expand or collapse while said belt travels through an arcuate path in the plane of said belt.

10. The overlay of claim 1, wherein each of said first rod member engaging means has one of said first rod member retaining means.

11. The overlay of claim 1, wherein each of said first rod member retaining means has a first jaw means.

12. The overlay of claim 1, further comprising a plurality of second rod member retaining means, wherein each of said second rod member retaining means is releasably clippable onto said second rod member by movement normal to the plane of said belt.

13. The overlay of claim 12, wherein each of said second rod member engaging means has one of said second rod member retaining means.

14. The overlay of claim 12, wherein each of said first rod member retaining means has a first jaw means and each of said second rod member retaining means has a second jaw means.

15. The overlay of claim 14, wherein said plurality of first jaw means cooperates with said first rod member engaging means to releasably retain said first rod member and wherein said plurality of second jaw means cooperates with said second rod member engaging means to releasably retain said second rod member.

16. The overlay of claim 15, wherein each of said plurality of first jaw means defines a first mouth into one of said first downwardly directed openings and wherein each of said plurality of second jaw means defines a second mouth into one of said second downwardly directed openings.

17. The overlay of claim 15, wherein said plurality of first jaw means is associated with and corresponds to a first plurality of said segments and wherein said plurality of second jaw means is associated with and corresponds to a second plurality of said segments.

18. The overlay of claim 17, wherein each of said plurality of first jaw means comprises a first jaw member and a second jaw member and wherein each of said plurality of second jaw means comprises a third jaw member and a fourth jaw member.

19. The overlay of claim 18, wherein in each of the segments of said first plurality of said segments said first jaw member is attached to said connecting means and extends toward said reinforcing member and said second jaw member is attached to said reinforcing member and extends toward said connecting means.

20. The overlay of claim 19, wherein said first jaw member and said second jaw member extend toward each other and define a first mouth into the two first downwardly directed openings of the two longitudinal members connected by said connecting means.

21. The overlay of claim 17, wherein in each of the segments of said second plurality of said segments said third jaw member is attached to said connecting means and extends toward said reinforcing member and said fourth jaw member is attached to said reinforcing member and extends toward said connecting means.

22. The overlay of claim 21, wherein said third jaw member and said fourth jaw member extend toward each other and define a second mouth into the two second downwardly directed openings of the two longitudinal members connected by said connecting means.

23. The overlay of claim 14, wherein each of said first and second jaw means comprises jaw parts having mutually inclined surfaces at the entry way of said mouth which assist in positioning said first and second rod member retaining means relative to said first and second rod members, respectively, prior to attachment thereto and which cause corresponding said jaw parts to be urged apart resiliently to permit said first and second rod members to enter into said first and second rod member engaging means, respectively.

24. The overlay of claim 1, wherein said first and second downwardly directed openings are dimensioned and positioned on their respective longitudinal members such that as said belt travels through an arcuate path in the plane of said belt there is substantially no provision for relative expansive longitudinal movement adjacent the inner lateral edge of said belt and along the outer edge of said belt permits relative expansive longitudinal movement of an amount sufficient to accommodate the increase in distance which occurs during the transition of said belt from an initial straight-line path configuration to a curved configuration having a desired radius of curvature for said arcuate path.

25. In a conveyor system having at least one ware transport section and made up of a succession of overlays for transporting articles, each overlay providing an upper overlay surface upon which said articles are supported, each overlay being supported and moved along by a belt of spaced rod members extending transversely of the direction of travel of said belt, the improvement comprising in combination:

said overlay comprising
 a plurality of laterally spaced substantially longitudinally disposed longitudinal members;
 a plurality of transversely disposed connecting means each connecting adjacent ones of said longitudinal members, adjacent ones of said connecting means connecting opposite end portions of said longitudinal members so that the longitudinal members and connecting means form a plurality of alternating oppositely opening nestable segments to allow nesting thereof with overlays immediately ahead and behind said overlay on said belt;
 each of said longitudinal members having a first support means and a second support means which are opposed and longitudinally spaced from each other,
  said first support means including a first rod member engaging means operable to receive a first rod member when said overlay is moved relatively toward said first rod member in a direction normal to the plane of said belt,
  said first rod member engaging means being provided with a first downwardly directed opening for receiving said first rod member, and
  said second support means including a second rod member engaging means operable to receive a second rod member when said overlay is moved relatively toward said second rod member in a direction normal to the plane of said belt,
  said second rod member engaging means being provided with a second downwardly directed opening for receiving said second rod member,
  said second downwardly directed opening extending longitudinally of said longitudinal member and parallel to the plane of said belt so as to allow said belt to expand or collapse while said belt travels through an arcuate path about in the plane of said belt; and
 a plurality of first rod member retaining means, wherein each of said first rod member retaining means is releasably clippable onto said first rod member by movement normal to the plane of said belt.

26. The improvement to the conveyor system of claim 25, wherein said each of connecting means comprises a direct connection of the opposing end portions of two longitudinal members wherein the segments formed thereby are angular in shape.

27. The improvement to the conveyor system of claim 26, further comprising a reinforcing means located within each of said segments between each corresponding pair of connected longitudinal members for inhibiting compression or expansion of said overlay in a direction parallel to said first and second rod members.

28. The improvement to the conveyor system of claim 27, wherein each of said reinforcing means is a reinforcing member, the ends of said reinforcing member being connected to opposing sides of said pair of connected longitudinal members of the respective segment at a point thereon intermediate of said first and second support means thereof.

29. The improvements to the conveyor system of claim 27, wherein each of said reinforcing means comprises a reinforcing member connecting and integral to said connecting means and to opposing sides of said pair of connected longitudinal members adjacent to said connecting means, said reinforcing member being a solid mass, said solid mass having a bottom surface defining a portion of the corresponding downwardly directed opening of said first support means or of said second support means.

30. The improvement to the conveyor system of claim 25, wherein each of said connecting means comprises a connecting member connected to and interposed between the opposing end portions of two longitudinal members.

31. The improvement to the conveyor system of claim 25, further comprising reinforcing means located within each of said segments between each corresponding pair of connected longitudinal members for inhibiting compression or expansion of said overlay in a direction parallel to said first and second rod members.

32. The improvement to the conveyor system of claim 31, wherein each of said reinforcing means is a reinforcing member, the ends of said reinforcing member being connected to opposing sides of said pair of connected longitudinal members at a point thereon intermediate of said first and second support means.

33. The improvement to the conveyor system of claim 25, wherein each of said first downwardly directed openings extends longitudinally of their respective longitudinal member and parallel to the plane of said belt so as to allow said belt to expand or collapse while said belt travels through an arcuate path in the plane of said belt.

34. The improvement to the conveyor system of claim 25, wherein each of said first rod member engaging means has one of said first rod member retaining means.

35. The improvement to the conveyor system of claim 25, wherein each of said first rod member retaining means has a first jaw means.

36. The improvement to the conveyor system of claim 25, wherein said overlay further comprises a plurality of second rod members retaining means, wherein each of said second rod member retaining means is releasably clippable onto said second rod member by movement normal to the plane of said belt.

37. The improvement to the conveyor system of claim 36, wherein each of said second rod member engaging means has one of said second rod member retaining means.

38. The improvement to the conveyor of system of claim 36, wherein each of said first rod member retaining means has a first jaw means and each of said second rod member retaining means has a second jaw means.

39. The improvement to the conveyor system of claim 38, wherein said plurality of first jaw means cooperates with said first rod member engaging means to releasably retain said first rod member and wherein said plurality of second jaw means cooperates with said second rod member engaging means to releasably retain said second rod member.

40. The improvement to the conveyor system of claim 39, wherein each of said plurality of first jaw means defines a first mouth into one of said first downwardly directed openings and wherein each of said plurality of second jaw means defines a second mouth into one of said second downwardly directed openings.

41. The improvement to the conveyor system of claim 39, wherein said plurality of first jaw means is associated with and corresponds to a first plurality of said segments and wherein said plurality of second jaw means is associated with and corresponds to a second plurality of said segments.

42. The improvement to the conveyor system of claim 41, wherein each of said plurality of first jaw means comprises a first jaw member and a second jaw member and wherein each of said plurality of second jaw means comprises a third jaw member and a fourth jaw member.

43. The improvement to the conveyor system of claim 42, wherein in each of the segments of said first plurality of said segments said first jaw member is attached to said connecting means and extends toward said reinforcing member and said second jaw member is attached to said reinforcing member and extends toward said connecting means.

44. The improvement to the conveyor system of claim 43, wherein said first jaw member and said second jaw member extend toward each other and define a first mouth into the two first downwardly directed openings of the two longitudinal members connected by said connecting means.

45. The improvement to the conveyor system of claim 42, wherein in each of the segments of said second plurality of said segments said third jaw member is attached to said connecting means and extends toward said reinforcing member and said fourth jaw member is attached to said reinforcing member and extends toward said connecting means.

46. The improvement to the conveyor system of claim 45, wherein said third jaw member and said fourth jaw member extend toward each other and define a second mouth into the two second downwardly directed openings of the two longitudinal members connected by said connecting means.

47. The improvement to the conveyor system of claim 38, wherein each of said first and second jaw means comprises jaw parts having mutually inclined surfaces at the entry way of said mouth which assist in positioning said first and second rod member retaining means relative to said first and second rod members, respectively, prior to attachment thereto and which cause corresponding said jaw parts to be urged apart resiliently to permit said first and second rod members to enter into said first and second rod member engaging means, respectively.

48. The improvement in the conveyor system of claim 25, wherein said first and second downwardly directed openings are dimensioned and positioned on their respective longitudinal members such that as said belt travels through an arcuate path in the plane of said belt there is substantially no provision for relative expansive longitudinal movement adjacent the inner lateral edge of said belt and along the outer edge of said belt permits relative expansive longitudinal movement of an amount sufficient to accommodate the increase in distance which occurs during the transition of said belt from an initial straight-line path configuration to a curved configuration having a desired radius of curvature for said arcuate path.

49. A ware transport overlay for use on a conveyor belt having a plurality of spaced transverse rods, said overlay comprising:
an elongated zig-zag member forming alternating oppositely opening nestable portions to allow nesting thereof with similar overlays immediately ahead and behind said overlay on said belt, said zig-zag member having a lower surface;
a plurality of downwardly opening snap-on retaining means on said lower surface for releasably snapping said overlay down onto at least one of the rods of said conveyor belt; and
reinforcing means transversely disposed within each of said nestable portions, each of said nestable portions having a pair of opposing, interior sides which are connected to each other at one end thereof by connecting means, wherein said reinforcing means is connected to said opposing, interior sides.

50. The overlay of claim 49, wherein each of a plurality of said nestable portions comprises one of said plurality of snap-on retaining means, wherein each of said plurality of snap-on retaining means is longitudinally disposed within the enclosed area defined by the respective nestable portion and the associated reinforcing means and connected to the associated reinforcing means and connecting means of the respective nestable portion.

51. A ware transport overlay for use on a conveyor belt having a plurality of spaced transverse rods, said overlay comprising:
an elongated zig-zag member forming alternating oppositely opening nestable portions to allow nesting thereof with similar overlays immediately ahead and behind said overlay on said belt, said zig-zag member having a lower surface;
a plurality of downwardly opening snap-on retaining means on said lower surface for releasably snapping said overlay down onto at least one of the rods of said conveyor belt; and
means for allowing said belt to expand or collapse while said belt travels through an arcuate path in the plane of said belt.

52. In a conveyor system having at least one ware transport section and made up of a succession of overlays for transporting articles, each overlay providing an upper overlay surface upon which said articles are supported, each overlay being supported and moved along by a belt of spaced rod members extending transversely of the direction of travel of said belt, the improvement comprising in combination:
said overlay comprising
an elongated zig-zag member forming alternating oppositely opening nestable portions to allow nesting thereof with similar overlays immediately ahead and behind said overlay on said belt, said zig-zag member having a lower surface;
a plurality of downwardly opening snap-on retaining means on said lower surface for releasably snapping said overlay down onto at least one of the rods of said conveyor belt; and
reinforcing means transversely disposed within each of said nestable portions, each of said nestable portions having a pair of opposing, interior sides which are connected to each other at one end thereof by connecting means, wherein said reinforcing means is connected to said opposing, interior sides.

53. The improvement to the conveyor system of claim 52, wherein each of a plurality of said nestable portions comprises ones of said plurality of snap-on retaining means, wherein each of said plurality of snap-on retaining means is longitudinally disposed within the enclosed area defined by the respective nestable portion and the associated reinforcing means and connected to the associated reinforcing means and connecting means of the respective nestable portion.

54. In a conveyor system having at least one ware transport section and made up of a succession of overlays for transporting articles, each overlay providing an upper overlay surface upon which said articles are supported, each overlay being supported and moved along by a belt of spaced rod members extending transversely of the direction of travel of said belt, the improvement comprising in combination:
said overlay comprising
an elongated zig-zag member forming alternating oppositely opening nestable portions to allow nesting thereof with similar overlays immediately ahead and behind said overlay on said belt, said zig-zag member having a lower surface;
a plurality of downwardly opening snap-on retaining means on said lower surface for releasably snapping said overlay down onto at least one of the rods of said conveyor belt; and
means for allowing said belt to expand or collapse while said belt travels through an arcuate path in the plane of said belt.

55. The overlay of claim 8,
wherein each of said first rod member retaining means has a first jaw means,
wherein said plurality of first jaw means cooperates with said first rod member engaging means to releasably retain said first rod member, and
wherein said plurality of first jaw means is associated with and corresponds to a first plurality of said segments.

56. The overlay of claim 55, wherein each of said plurality of first jaw means comprises a first jaw member and a second jaw member.

57. The overlay of claim 56, wherein in each of the segments of said first plurality of said segments said first jaw member is attached to said connecting means and extends toward said reinforcing member and said second jaw member is attached to said reinforcing member and extends toward said connecting means.

58. The overlay of claim 57, wherein said first jaw member and said second jaw member extend toward each other and define a first mouth into the two first downwardly directed openings of the two longitudinal members connected by said connecting means.

59. The overlay of claim 55, further comprising a plurality of second rod member retaining means, wherein each of said second rod member retaining means is releasably clippable onto said second rod member by movement normal to the plane of said belt,
   wherein each of said second rod member retaining means has a second jaw means,
   wherein said plurality of second jaw means cooperates with said second rod member engaging means to releasably retain said second rod member, and
   wherein said plurality of second jaw means is associated with and corresponds to a second plurality of said segments.

60. The overlay of claim 59, wherein each of said plurality of second jaw means comprises a third jaw member and a fourth jaw member.

61. The overlay of claim 60, wherein in each of the segments of said second plurality of said segments said third jaw member is attached to said connecting means and extends toward said reinforcing member and said fourth jaw member is attached to said reinforcing member and extends toward said connecting means.

62. The overlay of claim 61, wherein said third jaw member and said fourth jaw member extend toward each other and define a second mouth into the two second downwardly directed openings of the two longitudinal members connected by said connecting means.

63. The overlay of claim 55, wherein each of said connecting means comprises a direct connection of the opposing end potions of two longitudinal members wherein the segments formed thereby are angular in shape.

64. The overlay of claim 55, wherein each of said connecting means comprises a connecting member connected to and interposed between the opposing end portions of two longitudinal members.

65. The overlay of claim 55, wherein each of said first downwardly directed openings extends longitudinally of their respective longitudinal member and parallel to the plane of said belt so as to allow said belt to expand or collapse while said belt travels through an arcuate path in the plane of said belt.

66. The improvement to the conveyor system of claim 32,
   wherein each of said first rod member retaining means has a first jaw means,
   wherein said plurality of first jaw means cooperates with said first rod member engaging means to releasably retain said first rod member, and
   wherein said plurality of first jaw means is associated with and corresponds to a first plurality of said segments.

67. The improvement to the conveyor system of claim 66, wherein each of said plurality of first jaw means comprises a first jaw member and a second jaw member.

68. The improvement to the conveyor system of claim 67, wherein in each of the segments of said first plurality of said segments said first jaw member is attached to said connecting means and extends toward said reinforcing member and said second jaw member is attached to said reinforcing member and extends toward said connecting means.

69. The improvement to the conveyor system of claim 68, wherein said first jaw member and said second jaw member extend toward each other and define a first mouth into the two first downwardly directed openings of the two longitudinal members connected by said connecting means.

70. The improvement to the conveyor system of claim 66, further comprising a plurality of second rod member retaining means, wherein each of said second rod member retaining means is releasably clippable onto said second rod member by movement normal to the plane of said belt,
   wherein each of said second rod member retaining means has a second jaw means,
   wherein said plurality of second jaw means cooperates with said second rod member engaging means to releasably retain said second rod member, and
   wherein said plurality of second jaw means is associated with and corresponds to a second plurality of said segments.

71. The improvement to the conveyor system of claim 70, wherein each of said plurality of second jaw means comprises a third jaw member and a fourth jaw member.

72. The improvement to the conveyor system of claim 71, wherein in each of the segments of said second plurality of said segments said third jaw member is attached to said connecting means and extends toward said reinforcing member and said fourth jaw member is attached to said reinforcing member and extends toward said connecting means.

73. The improvement to the conveyor system of claim 72, wherein said third jaw member and said fourth jaw member extend toward each other and define a second mouth into the two second downwardly directed openings of the two longitudinal members connected by said connecting means.

74. The improvement to the conveyor system of claim 66, wherein each of said connecting means comprises a direct connection of the opposing end portions of two longitudinal members wherein the segments formed thereby are angular in shape.

75. The improvement to the conveyor system of claim 66, wherein each of said connecting means comprises a connecting member connected to and interposed between the opposing end portions of two longitudinal members.

76. The improvement to the conveyor system of claim 66, wherein each of said first downwardly directed openings extends longitudinally of their respective longitudinal member and parallel to the plane of said belt so as to allow said belt to expand or collapse while said belt travels through an arcuate path in the plane of said belt.

77. A ware transport overlay for use on a conveyor belt having a plurality of spaced transverse rods, said overlay comprising:
   an elongated zig-zag member forming alternating oppositely opening nestable segments to allow nesting thereof in a direction generally perpendicular to said rods with similar zig-zag members of overlays immediately ahead and behind said overlay on said belt, said zig-zag member having a lower surface; and
   a plurality of downwardly opening snap-on retaining devices on said lower surface and configured to releasably snap said overlay down onto one of said rods of said conveyor belt so as to releasably retain said zig-zag member thereto and to substantially longitudinally orient said zig-zag member relative to said rods.

78. The overlay of claim 77, wherein said zig-zag member comprises a plurality of laterally spaced substantially longitudinally disposed longitudinal members relative to the direction of travel of said belt and a plurality of transversely disposed connection means relative to the direction of travel of said belt, each of said connecting means connecting adjacent ones of said longitudinal members, adjacent ones of said connecting means connecting opposite end portions of said longitudinal members so that the longitudinal members and connecting means form a plurality of said alternating oppositely nestable segments to allow nesting thereof with similar zig-zag members of overlays immediately ahead and behind said overlay on said belt.

79. The overlay of claim 78, wherein each of said connecting means comprises a direct connection of the opposing end portions of two longitudinal members wherein the segments formed thereby are angular in shape.

80. The overlay of claim 78, wherein each of said connecting means comprises a connecting member connected to and interposed between the opposing end portions of two longitudinal members.

81. The overlay of claim 78, further comprising reinforcing means located within each of said segments between each corresponding pair of connected longitudinal members for inhibiting compression or expansion of said overlay in a direction parallel to said rods.

82. The overlay of claim 81, wherein each of said reinforcing means is a reinforcing member, the ends of said reinforcing member being connected to opposing sides of said pair of connected longitudinal members of the respective segment at a point intermediate of the ends of said pair of connected longitudinal members.

83. The overlay of claim 81, wherein each of said reinforcing means comprises a reinforcing member connecting and integral to said connecting means and to opposing sides of said pair of connected longitudinal members adjacent to said connecting means, said reinforcing member being a solid mass.

84. The overlay of claim 78, wherein each of said plurality of downwardly opening snap-on retaining devices comprises a plurality of first jaw means for releasably retaining a first rod.

85. The overlay of claim 84, wherein each of said plurality of first jaw means comprises at least one first jaw member and at least one second jaw member.

86. The overlay of claim 85, wherein each of said plurality of first jaw means is associated with and corresponds to a first plurality of said segments.

87. The overlay of claim 86, further comprising reinforcing means located within each of said segments between each corresponding pair of connected longitudinal members for inhibiting compression of expansion of said overlay in a direction parallel to said rods, wherein each of said reinforcing means is a reinforcing member, the ends of said reinforcing means is a reinforcing member, the ends of said reinforcing member being connected to opposing sides of said pair of connected longitudinal members of the respective segment at a point intermediate of the ends of said pair of connected longitudinal members and wherein in each of said first plurality of said segments said at least one first jaw member is attached to said connecting means and extends toward said reinforcing member and said at least one second jaw member is attached to said reinforcing member and extends toward said connecting means.

88. The overlay of claim 87, wherein each of said at least one first jaw member and a corresponding one of said at least one second jaw member extend toward each other and define a first mouth into a corresponding one of said retaining devices.

89. The overlay of claim 86, wherein in each of said first plurality of said segments a first jaw member and a second jaw member is integral to each of said pair of connected longitudinal members and extend toward each other and define a first mouth into a corresponding one of said retaining devices.

90. The overlay of claim 84, wherein each of said plurality of downwardly opening snap-on retaining devices further comprises a plurality of second jaw means for releasably retaining a second rod.

91. The overlay of claim 90, wherein each of said plurality of second jaw means comprises at least one third jaw member and at least one fourth jaw member.

92. The overlay of claim 91, wherein each of said plurality of second jaw means is associated with and corresponds to a second plurality of said segments.

93. The overlay of claim 92, further comprising reinforcing means located within each of said segments between each corresponding pair of connected longitudinal members for inhibiting compression or expansion of said overlay in a direction parallel to said rods, wherein each of said reinforcing means is a reinforcing member, the ends of said reinforcing member being connected to opposing sides of said pair of connected longitudinal members of the respective segment at a point intermediate of the ends of said pair of connected longitudinal members and wherein in each of said second plurality of said segments said at least one third jaw member is attached to said connecting means and extend toward said reinforcing member and said at least one fourth jaw member is attached to said reinforcing member and extends toward said connecting means.

94. The overlay of claim 93, wherein each of said at least one third jaw member and a corresponding one of said at least one fourth jaw member extend toward each other and define a second mouth into a corresponding one of said retaining devices.

95. The overlay of claim 92, wherein in each of said second plurality of said segments a third jaw member and a fourth jaw member is integral to each of said pair of connected longitudinal members and extend toward each other and define a second mouth into a corresponding one of said retaining devices.

96. In a conveyor system having at least one ware transport section and made up of a succession of overlays for transporting articles, each overlay providing an upper overlay surface upon which said articles are supported, each overlay being supported and moved along by a belt of spaced rod members extending transversely of the direction of travel of said belt, the improvement comprising in combination:

said overlay comprising an elongated zig-zag member forming alternating oppositely opening nestable segments to allow nesting thereof in a direction generally perpendicular to said rods with similar zig-zag members of overlays immediately ahead and behind said overlay on said belt, said zig-zag member having a lower surface; and a plurality of downwardly opening snap-on retaining devices on said lower surface and configured to releasably snap said overlay down onto one of said rods of said conveyor belt so as to releasably retain said zig-zag member thereto and to substantially longitudinally orient said zig-zag member relative to said rods.

* * * * *